United States Patent
Kaczynski (10) Patent No.: US 7,174,437 B2
(45) Date of Patent: Feb. 6, 2007

(54) MEMORY ACCESS MANAGEMENT IN A SHARED MEMORY MULTI-PROCESSOR SYSTEM

(75) Inventor: Tomasz Kaczynski, Prior Lake, MN (US)

(73) Assignee: Silicon Graphics, Inc., Sunnyvale, CA (US)

( * ) Notice: Subject to any disclaimer, the term of this patent is extended or adjusted under 35 U.S.C. 154(b) by 452 days.

(21) Appl. No.: 10/687,196

(22) Filed: Oct. 16, 2003

(65) Prior Publication Data

US 2005/0086439 A1    Apr. 21, 2005

(51) Int. Cl.
*G06F 13/18* (2006.01)
(52) U.S. Cl. ...................... 711/158; 711/151
(58) Field of Classification Search ............... None
See application file for complete search history.

(56) References Cited

U.S. PATENT DOCUMENTS

| | | | | |
|---|---|---|---|---|
| 4,096,571 A * | 6/1978 | Vander Mey | ............ | 711/151 |
| 6,272,567 B1 * | 8/2001 | Pal et al. | ............ | 710/56 |
| 6,279,074 B1 * | 8/2001 | Pence | ............ | 711/112 |
| 6,401,212 B1 * | 6/2002 | Bondi et al. | ............ | 713/340 |
| 6,557,084 B2 * | 4/2003 | Freerksen et al. | ............ | 711/147 |
| 6,938,131 B2 * | 8/2005 | Ogasawara | ............ | 711/151 |
| 2003/0072260 A1 * | 4/2003 | Janoska et al. | ............ | 370/229 |
| 2006/0059319 A1 * | 3/2006 | Frenzel et al. | ............ | 711/151 |

* cited by examiner

*Primary Examiner*—Mano Padmanabhan
*Assistant Examiner*—Jasmine Song
(74) *Attorney, Agent, or Firm*—Schwegman, Lundberg, Woessner & Kluth, P.A.

(57) ABSTRACT

In one embodiment, an apparatus includes a requester node to transmit a request for data in a memory. The apparatus also includes a service node that includes the memory. The service node receives the request for the data, wherein the service node is to set a congestion flag in response to the request sent back to the requester node upon determining that access to the data is congested. The requester node is to freeze priority updates for the data upon receipt of the congestion flag.

34 Claims, 7 Drawing Sheets

MEMORY ACCESS MANAGEMENT IN A SHARED MEMORY MULTI-PROCESSOR SYSTEM

TECHNICAL FIELD

This invention relates generally to electronic data processing and more particularly, to memory access management in a shared memory multi-processor system.

BACKGROUND

Multiprocessor computer systems have long been valued for the high performance they offer by utilizing multiple processors that are not individually capable of the same high level of performance as the multiprocessor system. In such multiprocessor systems, tasks are divided among more than one processor, such that each processor does a part of the computation of the system. Therefore, more than one task can be carried out at a time with each task or thread running on a separate processor, or a single task can be broken up into pieces that can be assigned to each processor. Multiprocessor systems incorporate many methods of dividing tasks among their processors, but all benefit from the ability to do computations on more than one processor simultaneously. Traditionally, multiprocessor systems were large mainframe or supercomputers with several processors mounted in the same physical unit.

With multiple processors and multiple computational processes within a multiprocessor system, a mechanism is needed for allowing processors to share access to data and share the results of their computations. Centralized memory systems use a single central bank of memory that all processors can access, such that all processors can access the central memory at roughly the same speed. Still other systems have distributed memory for individual processors or groups of processors and provide faster access to memory that is local to each processor or group of processors, but access to data from other processors takes somewhat longer than in centralized memory systems.

Shared address memory systems allow multiple processors to access the same memory, whether distributed or centralized, to communicate with other processors via data stored in the shared memory. Cache memory can be utilized to attempt to provide faster access to data each processor is likely to need and to reduce requests for the same commonly used data from multiple processors on the system bus.

Cache in a shared address system typically caches memory from any of the shared memory locations, whether local or remote from the processor requesting the data. The cache associated with each processor or group of processors in a distributed shared memory system likely maintains copies of data from memory local to a number of other processor nodes. Information about each block of memory is kept in a directory, which keeps track of data such as which caches have copies of the block, whether the cache is dirty, and other related data. The directory is used to maintain cache coherency, or to ensure that the system can determine whether the data in each cache is valid. The directory is also used to keep track of which caches hold data that is to be written, and facilitates granting exclusive write access to one processor or I/O device. After write access has been granted and a memory location is updated, the cached copies are marked as dirty.

As such multi-processor systems continue to grow in size, the number of requests by the different processors to various data in different memories also increases. Accordingly, such systems are vulnerable to becoming congested. Further, such systems are prone to request starvation, wherein the length of time for servicing the requests for data is such that the performance of applications executing on the system is adversely affected. Moreover, such large multi-processor systems may become difficult to manage with regard to fairness among servicing of the requests.

In a typical system, a request priority scheme is employed, wherein the requests for data are assigned priorities. Such a system also includes a mechanism to trap excessively NACKed requests (i.e., those requests that receive negative acknowledgements (NACKs), indicating that the requests cannot yet be serviced). Therefore, in response to a NACK, the processor requesting data from memory may transmit another request for the data. In this system, the priority of the request is a step function based on the number of NACKs received in response to the request. In the absence of such a priority scheme, the chance of requests being serviced depends on the frequency of its visits to the servicing node (servicing the requests for the data). Therefore, requests from processors having a relatively closer proximity to the servicing node are favored in comparison to those requests from processors that are more distant. Furthermore, the NACK-based priority scheme amplifies the natural priority of requests, thus making the servicing of more distant requests more difficult. Such an imbalance might be further aggravated by a system that is congested.

This typical system only guarantees operation that is free from requests that are starved (not processed for an excessive amount of time) if there is no more than one request that is of highest priority for given data in a memory at a time. However, this restriction is routinely violated. Thus, in addition to remote requests that are "handicapped" (in comparison to requests that are more local to the servicing node), such systems produce excessively NACKed requests. These NACKed requests are typically trapped and handed over to software, which injects them back into the system. Accordingly, such a system degrades the fairness among requests; does not provide for starvation free operation; and is costly in terms of time and resources.

SUMMARY

Methods, apparatuses and systems for memory access management in a shared memory multi-processor system are described. In one embodiment, an apparatus comprises a requester logic to transmit a request for a resource to a service node. The request has a priority. The requester logic sets the priority of the request. The service node marks the resource as congested, if the priority of the request is of a highest priority and the request is denied access to the resource.

In an embodiment, a service node comprises a memory to store a number of lines of data. The service node also includes a server logic to receive requests for a line of data of the number of lines of data. The server logic determines if access to the line of data is congested.

In one embodiment, an apparatus includes a requester node to transmit a request for data in a memory. The apparatus also includes a service node that includes the memory. The service node receives the request for the data, wherein the service node is to set a congestion flag in response to the request sent back to the requester node upon determining that access to the data is congested. The requester node is to freeze priority updates for the data upon receipt of the congestion flag.

In an embodiment, a system includes an interconnection network. The system also includes a number of nodes coupled together through the interconnection network. A first node of the number of nodes comprises a memory to store a number of lines of data. The first node also includes a hub that includes a server logic to receive, through the interconnection network, a request from a second node of the number of nodes for a line of data of the number of lines of data. The server logic precludes other nodes of the number of nodes from increasing priority of requests to the line of data, if the request is of a highest priority and, if, in response to the request, the server logic is to transmit a negative acknowledgement response.

In one embodiment, a system includes an interconnection network. The system also includes a number of nodes coupled together through the interconnection network. A requester node of the number of nodes comprises a number of processors. One of the number of processors generates a request for data in a memory. The requester node also includes a processor interface, wherein the processor interface comprises a request buffer. The processor interface also includes a requester logic to transmit the request having a priority to a service node of the number of nodes. The service node sends a response to the requester node to cause the requester logic to freeze priorities of other requests for the data if access to the data is congested.

In one embodiment, a method includes receiving a request for data in a memory. The request has a priority. The method also includes transmitting the request to a service node that includes the memory. Additionally, the method includes updating priorities of other requests for the data if the data is not congested.

In an embodiment, a method includes receiving a number of requests for a line of data in a service node. The method includes transmitting a positive acknowledgment to a request of the number of requests upon determining that the line of data is accessible. The method also includes transmitting a negative acknowledgement to a request of the number of requests upon determining that the line of data is not accessible. Additionally, the method includes freezing updates of priorities of the requests if one of the requests is of a highest priority and is denied access to the line of data. The method includes freezing updates of priorities of the requests if a number of the requests of the highest priority and of a second highest priority that are denied access to the line of data exceed a threshold.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatuses and systems for memory access management in a shared memory multi-processor system are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for memory access management in a distributed, shared, multi-processor system, in accordance with embodiments of the invention. A number of figures show flow diagrams illustrating operations for memory access management in a multi-processor system. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Embodiments of the invention allow for memory management in a multi-processor system. As described below, processors of a node may access data from memory lines that are stored in memories that are in other nodes in the system. Such a system is based on memory line requests and responses thereto. As further described below, embodiments of the invention freeze updates to priorities of memory line requests after congestion arises for a given memory line or congestion arises in a service node that includes the memory storing the given memory line. By freezing the updates to the priority after congested arises, the number of memory line requests having a highest priority are limited. This freeze of the updates effectively precludes lesser priority requests from acquiring the highest priority, thus letting the service node to serve outstanding highest priority requests in a finite amount of time. As further described below, notification of congestion is transmitted to each requester node that requests memory lines from the service node. Therefore, repeating this freeze operation at the different requester nodes allows for serviceability of the different requests of highest priority across the system in a finite amount of time, thereby precluding starvation of requests across the system. Moreover, besides limiting the number of requests of highest priority, this freeze operation preserves fairness among outstanding memory line requests.

Figure 1:
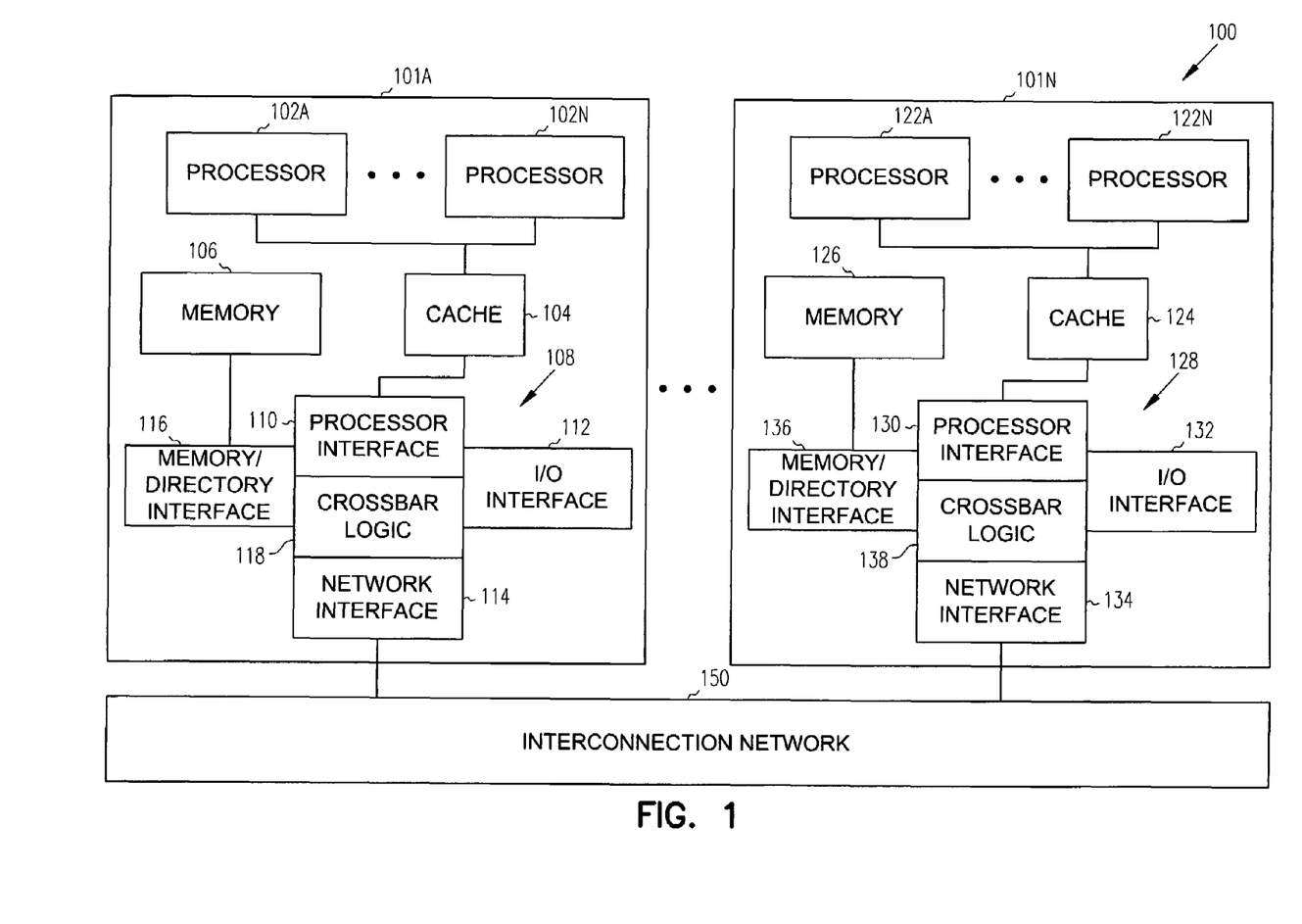
FIG. 1 illustrates a multi-processor system that includes memory access management, according to one embodiment of the invention.

FIG. 1 illustrates a multi-processor system that includes memory access management, according to one embodiment of the invention. FIG. 1 illustrates a system 100 that includes a number of nodes 101A–101N that are coupled together though an interconnection network 150. While only two nodes are illustrated in FIG. 1, embodiments of the invention are not so limited, as any number of such nodes may be used in the system 100.

The interconnection network 150 is representative of any type of network for coupling the number of nodes 101A–101N together. In one embodiment, the interconnection network 150 may be a number of communication lines for providing a point to point connection among the number of nodes 101A–101N. In an embodiment, the interconnection network 150 may be a number of communication lines that couple the number of nodes 101A–101N together in a nearest neighbor point-to-point configuration. In particular, the interconnection network 150 connects a given node 101 directly to nodes 101 that are adjacent thereto.

The node 101A includes a number of processors 102A–102N, a cache memory 104, a memory 106 and a hub 108. While embodiments of the invention are described such that lines of data that are requested are stored in the cache memory 104 or the memory 106, embodiments of the invention are not so limited. In an embodiment, the lines of data that are requested may include those lines of data in a cache memory that is internal to the number of processors 102A–102N. The hub 108 includes an input/output (I/O) interface 112, a network interface 114, a memory interface 116, a processor interface 110 and a crossbar logic 118. The number of processors 102A–102N are coupled to the processor interface 110 through the cache memory 104. The memory 106 is coupled to the memory interface 116. The network interface 114 is coupled to the interconnection network 150. The I/O interface 112 may be coupled to other devices (not shown) external to the node 101A, such as a storage disk, a monitor, a keyboard, etc. The crossbar logic 114 provides communications among the processor interface 110, the I/O interface 112, the network interface 114 and the memory interface 116. For example, if a different node 101 requests a line of data from the memory 106, the network interface 114 receives the request and forwards the request to the memory interface 116 through the crossbar logic 118.

The node 101N includes a number of processors 122A–122N, a cache memory 124, a memory 126 and a hub 128. The hub 128 includes an input/output (I/O) interface 132, a network interface 134, a memory interface 136, a processor interface 130 and a crossbar logic 138. The number of processors 122A–122N are coupled to the processor interface 130 through the cache memory 124. The memory 126 is coupled to the memory interface 136. The network interface 134 is coupled to the interconnection network 150. The I/O interface 132 may be coupled to other devices (not shown) external to the node 101N, such as a storage disk, a monitor, a keyboard, etc. The crossbar logic 134 provides communications among the processor interface 130, the I/O interface 132, the network interface 134 and the memory interface 136.

The number of processors 102A–102N and 122A–122N may be different types of general purpose application processors. In one embodiment, the cache memories 104 and 124 may be different types of cache in a unified or a split cache configuration. In an embodiment, the cache memory may be different levels of cache (e.g., L2, L3, etc.) in a multi-level cache configuration. In one embodiment, the cache memories 104 and 124 may be a directed-mapped cache or an n-way set-associative cache. While the memories 106 and 126 may be of any suitable type of memory, in an embodiment, the memories 106 and 126 are different types of Random Access Memory (RAM) (e.g., Synchronous RAM (SRAM), Synchronous Dynamic RAM (SDRAM), Dynamic RAM (DRAM), Double Data Rate (DDR)-SDRAM, etc.) of varying size.

The memory 106/126 includes a number of memory lines for storage of data. The cache memory 104/124 includes a number of cache lines (that may be the same size as the number of memory lines) for storage of data. In an embodiment, any of the cache lines may be duplicates of the number of memory lines for faster access of such data by the processors 102/122.

As further described below, any processor 102/122 may access lines of data from memories in the same or other nodes 101A–101N. For example, the processor 122N may access a cache line stored in the cache memory 104 in the node 101A. As described in FIG. 3, in an embodiment, logic in the memory/directory interface 116 and logic in the processor interface 110 transmit and receive requests for lines of data to and from other nodes in the system 100. Because at least two different processors 102/122 may be attempting to access the same line of data, such logic allows for a fairness with regard to processing of the requests such that theses requests are not starved. Moreover, as described below, such logic controls congestion of the system 100.

A given node 101 may be both a requester node and a service node. For example, if a processor in the given node 101 is requesting to access a line of data, the given node 101 acts as a requester node. If a processor in a remote node is attempting to access a line of data in a memory of the given node 101, the given node 101 acts as a service node.

Moreover, the term "local" is used to describe a unit that is within a same node, while the term "remote" is used to describe a unit that is in a different node. For example, the processor 102A is local with reference to the memory/directory interface 116, while the processor 122A is remote with reference to the memory/directory interface 116.

As described in more detail below, the processor interface 110/130 receives requests from one of the local processors for a memory line in a local/remote memory. The memory interface 116/136 (associated with the memory storing the requested memory line) receives the memory read request for memory lines. For example, the processor interface 130 may receive a memory request from the processor 122A of the node 101N to access a memory line from the memory 106 in the node 101A. The processor interface 130 generates a memory request that is forwarded to the node 101A. The memory/directory interface 116 receives the memory request and returns an acknowledgement (ACK) if the memory line is not busy (is accessible), if the memory line is not congested and if the node is not congested. The memory/directory interface 116 returns a negative acknowledgement (NACK) otherwise. Moreover, if a NACK is received, the processor interface 130 may attempt to retry the memory request.

Figure 2:
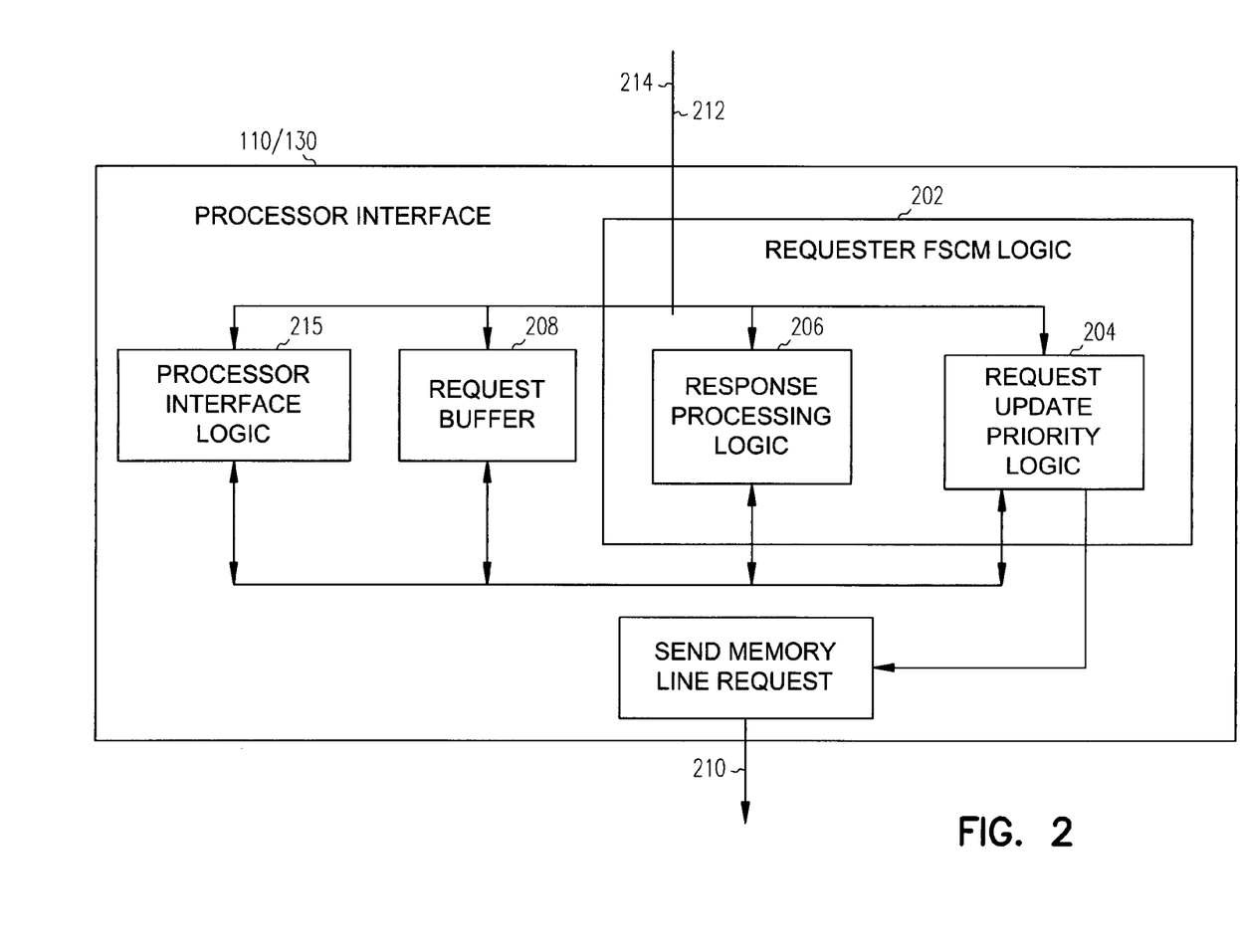
FIG. 2 illustrates a more detailed block diagram of a processor interface for a node in a multi-processor system, according to one embodiment of the invention.

FIG. 2 illustrates a more detailed block diagram of a processor interface for a node in a multi-processor system, according to one embodiment of the invention. In particular, FIG. 2 illustrates a more detailed block diagram of an embodiment of the processor interface 110/130. The processor interface 110/130 includes a fairness, starvation and congestion management (FSCM) requester logic 202, a request residency buffer 208 and a processor interface logic 215. The FSCM requester logic 202 includes a request update/priority logic 204 and a response processing logic 206. The request update/priority logic 204 and the response processing logic 206 are coupled to and exchanges signals with the request residency buffer 208 and the processor interface logic 215.

The request update/priority logic 204, the response processing logic 206 and the request residency buffer 208 are coupled to receive processor requests 212. The processor requests 212 are memory requests (received from one of the local processors) for a line of data in a local or remote memory 126/cache memory 124. The response processing logic 206 and the request residency buffer 208 are coupled to receive responses 214 from a local or remote memory interface 236 in response to memory requests 210 that are transmitted out from the processor interface 110/130.

The request update/priority logic 204 generates the memory requests 210 for line of data in a local or remote memory 126/cache memory 124. In an embodiment, the memory requests 210 include a number of flow control fields. In one embodiment, the number of flow control fields include a priority field and a registration field. The request update/priority logic 204 updates a priority field of the request at the time a memory request 210 is transmitted out from the processor interface 110/130. As further described below, the request update/priority logic 204 assigns the priority value to the memory requests 210 based on the time elapsed since a memory request from processor 212 has been stored in the request residency buffer 208.

In response to the memory line request 210, if the line of data is busy (or if the request does not have highest or second highest priority and the line or the node is congested), the server node 101 transmits a negative acknowledgement (NACK) response back to the FSCM requester logic 202. If a NACK response is received, the FSCM requester logic 202 stores control flow fields in the request residency buffer 208 and may subsequently retry the memory request 210. If the memory request 210 is a retry request, the value in the registration field is copied from the request residency buffer 208. As further described below, this registration value is used by the server node 101 to prevent duplicate registration of the request therein. The operations of processor interface 110/130 are described in more detail below in conjunction with the flow diagram of FIG. 4.

Figure 3:
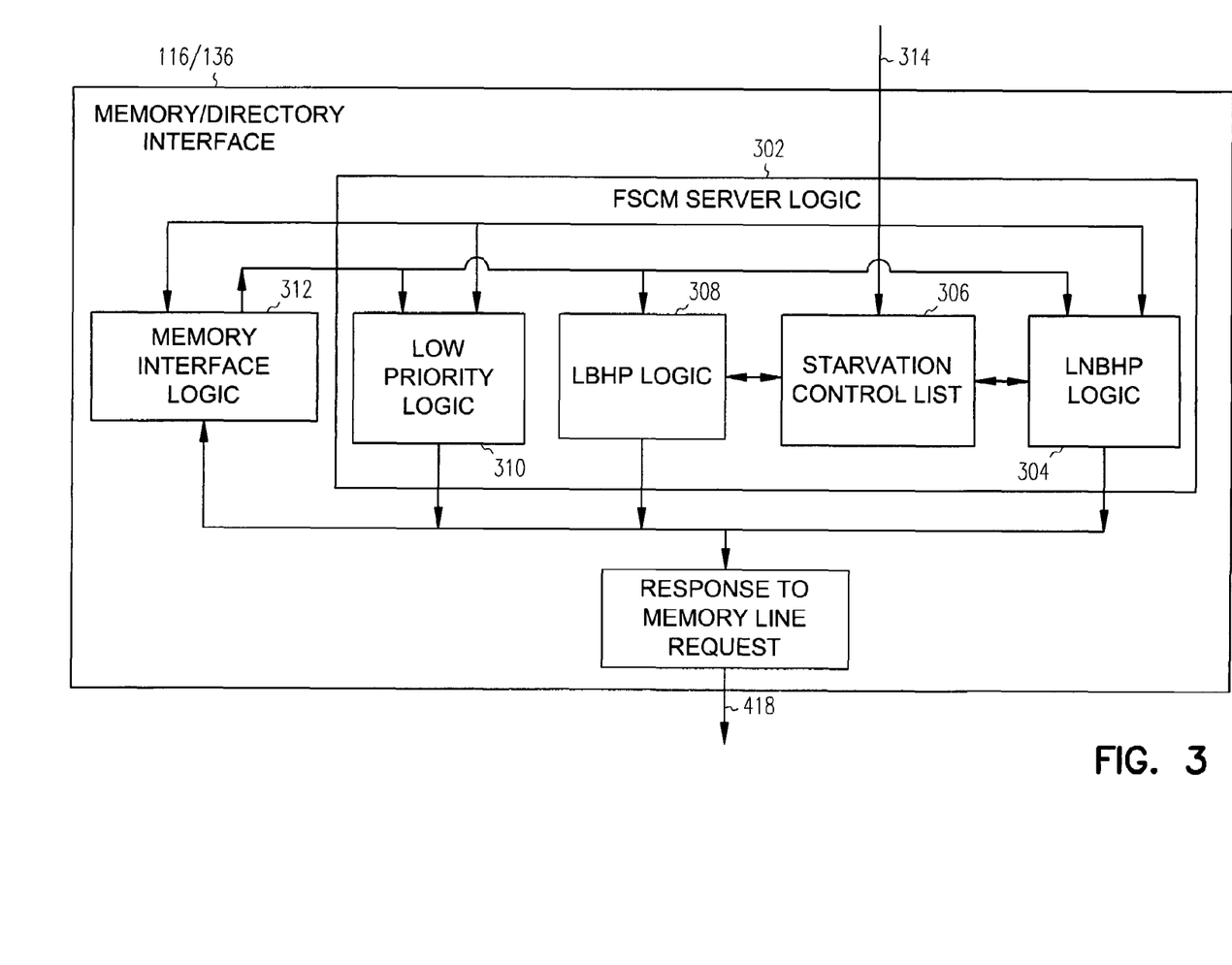
FIG. 3 illustrates a more detailed block diagram of a memory/directory interface for a node in a shared memory multi-processor system, according to one embodiment of the invention.

FIG. 3 illustrates a more detailed block diagram of a memory/directory interface for a node in a shared memory multi-processor system, according to one embodiment of the invention. In particular, FIG. 3 illustrates a more detailed block diagram of one embodiment of the memory/directory interface 116/136. The memory/directory interface 116/136 includes a FSCM server logic 302 and a memory interface logic 312. The FSCM server logic 302 includes a "Line Not Busy High Priority" (LNBHP) logic 304, the starvation control list 306, a "Line Busy High Priority" (LBHP) logic 308 and a low priority logic 310. The LNBHP logic 304 and the LBHP logic 308 are coupled to the starvation control list 306.

The memory interface logic 312, the LNBHP logic 304, the starvation control list 306, the LBHP logic 308 and the low priority logic 310 are coupled to receive memory line requests 314 from a remote or local processor interface 110/130. For each memory request, the memory interface logic 312 outputs a "line busy/line not busy" signal 315 into the LNBHP logic 304, the LBHP logic 308 and the low priority logic 310. The LNBHP logic 304, the LBHP logic 308 and the low priority logic 310 are to output a NACK or an acknowledgment (ACK) response 320 that is inputted into the memory interface logic 312 and is incorporated to the response 418 sent by the memory/directory interface 116/136 to the local or remote processor interface 110/130 that requested the memory line.

The starvation control list 306 may store a number of entries (e.g., 32 entries, 64 entries, etc.). In one embodiment, an entry in the starvation control list 306 includes a valid field, a memory line address field, a line congested field and a high priority counter field. In an embodiment, the LNBHP logic 304 and/or the LBHP logic 308 updates the starvation control list 306 based on processing of the memory requests 314. In an embodiment, the LNBHP logic 304 creates an entry in the starvation control list 306 upon determining that a memory line request having a highest priority or a second highest priority (assigned by the processor interface 110/130) is denied access (that is NACKed). For example, the memory line may be busy because such line may be currently being updated by a different processor.

The memory line address field includes the value of the memory address of the requested memory line. The high priority counter field tracks the number of memory requests to a given memory line (having a highest or second highest priority) by different processors in the system 200 that are NACKed. Accordingly, as described below, the high priority counter field is incremented once after a memory request (having a highest or second highest priority) is denied access for the first time. Conversely, after the memory line request associated with the entry is accepted for service, the high priority counter field is decremented. In one embodiment, an entry in the starvation control list 306 persist as long as the value of the high priority counter field is greater than zero.

The line congested field is a Boolean value indicating whether the memory line is congested. In one embodiment, the memory line is considered congested if the value of the high priority counter field exceeds a predefined threshold. Moreover, as further described below, a memory line is considered congested if a memory line request is not serviced in a predefined period of time. In other words, the memory line is considered congested if a given request is not serviced in a predefined time or if the number of requests having a highest or second highest priority exceeds a predefined threshold.

The number of nodes 101 also includes a node congested flag that is a Boolean value that indicates whether the node is congested. In an embodiment, a node is congested if the number of entries in the starvation control list 306 exceeds a threshold (a high watermark). For example, if the total number of entries in the starvation control list 306 is 64, the high watermark may be 60, thereby indicating that the starvation control list 306 is close to overflowing.

As further described below, the memory/directory interface 116/136 returns a response that is an acknowledgement (ACK) if the memory line is accessible and returns a response that is a negative acknowledgement (NACK) if the memory line is not accessible. The LNBHP logic 304, the LBHP logic 308 and the low priority logic 310 generate a response that includes a number of flow control fields. In an embodiment, the response may include a NACK control flow field that is a Boolean value that indicates whether the response is a NACK or an ACK. The response may also include a line congested flow control field that is a Boolean value that indicates whether the memory line is congested or not. Additionally, a response may include a node congested flow control field that is a Boolean value that indicates whether the service node is congested or not. In an embodiment, the response includes a registration flow control field that is a Boolean value that indicates whether the request is registered in the starvation control list 306 or not.

Figure 4:
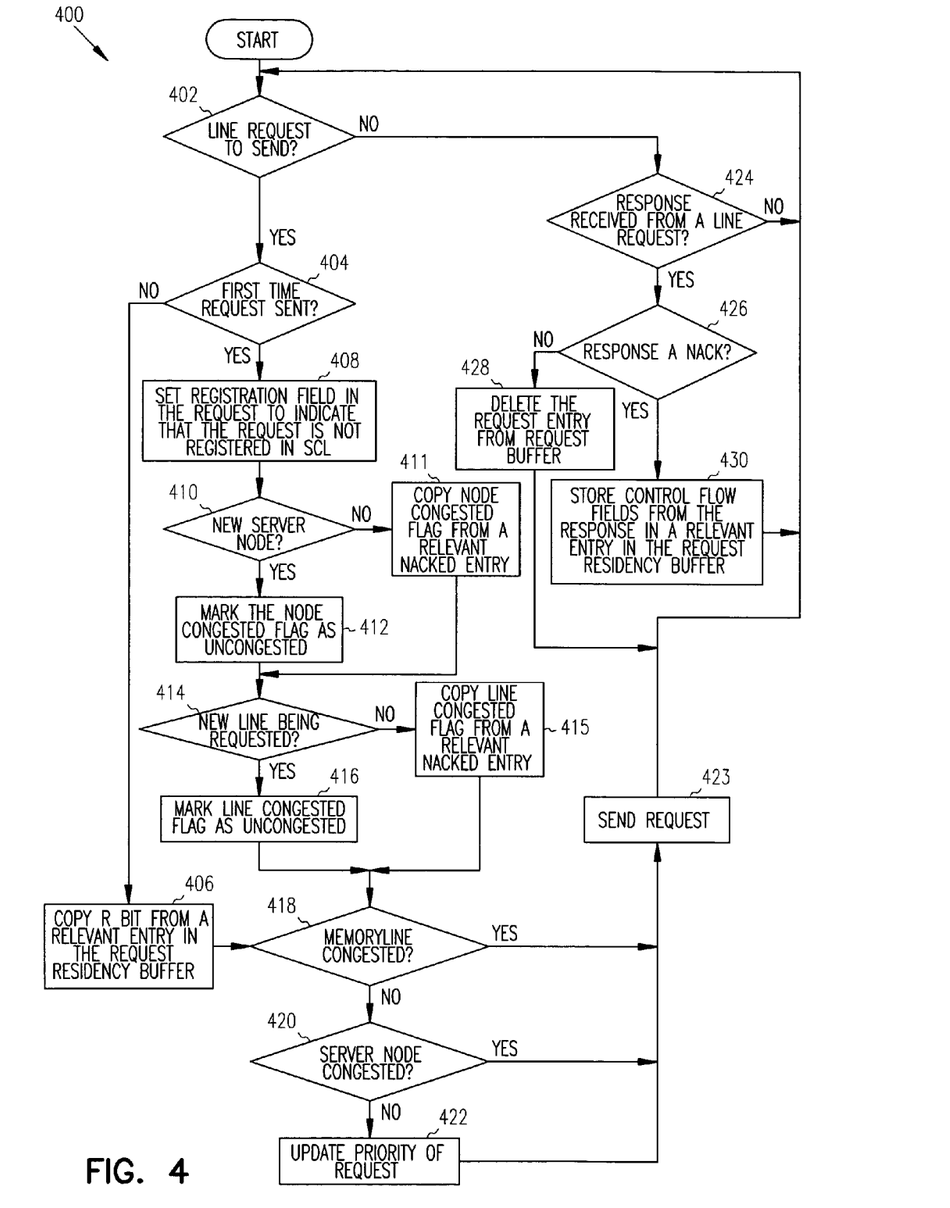
FIG. 4 illustrates a flow diagram for transmitting requests and processing responses for a memory line in a memory in a multi-processor system, according to one embodiment of the invention.

FIG. 4 illustrates a flow diagram for transmitting requests and processing responses for a memory line in a memory in a multi-processor system, according to one embodiment of the invention. In particular, the flow diagram 400 illustrates the operations of the processor interface 110/130 in a node acting as a requester node, according to one embodiment of the invention.

In block 402, a determination is made of whether in the request buffer there is a memory line request to be sent. With reference to the embodiment of the processor interface 110/130 shown FIG. 2, the processor interface logic 215 determines whether one of the local processors has made a memory line request (that is received as the processors request 212). In particular, one of the local processors may request to access a memory line for processing data contained therein. The memory line may be stored in a local or remote memory with reference to the node 101. Upon determining that there is not a line request to send, control continues at block 424, which is described in more detail below.

In block 404, upon determining that there is a memory line request to send, a determination is made of whether this memory line request is being sent for a first time. With reference to the embodiment of the processor interface 110/130 shown FIG. 2, the request update/priority logic 204 determines whether this memory line request is being sent for a first time. In particular, a given memory line request may be retried a number of times if a response having a NACK is received (because the memory line is not accessible).

In block 406, upon determining that the line request is not being sent for a first time, the registration field (the R bit) in the memory line request is copied from the relevant entry in the request residency buffer. With reference to the embodiment of the processor interface 110/130 shown FIG. 2, the request update/priority logic 204 updates the value of the registration field (the R bit) in the memory line request. As described below, the logic in the memory/directory interface 116/136 in the server node 101 that is to process the memory line request makes a determination of whether the memory line request needs to be registered in the starvation control list 306 based on the value of the registration field. Accordingly, at the service node, this registration field enables the memory line request to be registered only once even though the memory line request may be sent multiple times if the memory line is not available. Control continues at block 418, which is described in more detail below.

In block 408, upon determining that the line request is not being sent for a first time, the registration field in the memory line request is set to indicate that the request is not registered. With reference to the embodiment of the processor interface 110/130 shown FIG. 2, the request update/priority logic 204 sets the value of the registration field in the memory line request. Control continues at block 410.

In block 410, a determination is made of whether the server node that includes the memory storing the memory line that is being requested is new. With reference to the embodiment of the processor interface 110/130 shown FIG. 2, the request update/priority logic 204 determines whether the server node 101 is new. In particular, the request update/priority logic 204 determines whether this service node 101 new to the system 100. In an embodiment, this determination is based on the address of the memory line (which points to the server node). Accordingly, if the other addresses of the NACKed entries in the request residency buffer do not point to the server node, the server node is considered new. Upon determining that the server node 101 from which a memory line is being requested is not new, control continues at block 414, which is described in more detail below.

In block 411, upon determining that the server node 101 from which a memory line is being requested is not new, a node congested flag for this server node is copied from a relevant NACKed entry in the request residency buffer. Such entries include a node congested flag that indicates if this server node is congested. The request update/priority logic 204 copies the value of the node congested flag for this server node from a relevant NACKed entry into the memory line request. For example, the request update/priority logic 204 locates a NACKed entry in the request residency buffer for this server node (based on the address of such node). Control continues at block 414, which is described in more detail below.

In block 412, upon determining that the server node 101 from which a memory line is being requested is new, a node congested flag for this server node is marked as uncongested. With reference to the embodiment of the processor interface 110/130 shown FIG. 2, the request update/priority logic 204 marks the node congested flag for this node as uncongested. In particular, the request update/priority logic 204 updates an entry in the request residency buffer 208 for the different memory line requests. Such an entry includes a node congested flag that indicates if this server node is congested. Therefore, the request update/priority logic 204 marks this node congested flag as uncongested in the entry for this memory line request in the request residency buffer 208. Control continues at block 414.

In block 414, a determination is made of whether the memory line being requested is new. With reference to the embodiment of the processor interface 110/130 shown FIG. 2, the request update/priority logic 204 determines whether the memory line being requested is new. In an embodiment, the request update/priority logic 204 makes this determination based on a comparison of the other memory line requests that are stored in the request residency buffer. If a request for the memory line is not stored in the request residency buffer, the memory line being requested is new. Upon determining that the memory line being requested is not new, control continues at block 418, which is described in more detail below.

In block 415, upon determining that the memory line is not new, a line congested flag for this memory line in this server node is copied from a relevant NACKed entry in the request residency buffer. Such entries include a line congested flag that indicates if this memory line is congested. The request update/priority logic 204 copies the value of the line congested flag for this memory line for this server node from a relevant NACKed entry into the memory line request. For example, the request update/priority logic 204 locates a NACKed entry in the request residency buffer for this memory line request for this server node (based on the address of this memory line request). Control continues at block 418, which is described in more detail below.

In block 416, upon determining that the memory line is new, the line congested flag is marked as uncongested. With reference to the embodiment of the processor interface 110/130 shown FIG. 2, the request update/priority logic 204 marks the line congested flag as uncongested. In particular, the entry in the request residency buffer 208 includes a line congested flag that indicates if this memory line is congested. Therefore, the request update/priority logic 204 marks this line congested flag as uncongested in the entry for this memory line request in the request residency buffer 208. Control continues at block 418.

In block 418, a determination is made of whether the memory line is congested. With reference to the embodiment of the processor interface 110/130 shown FIG. 2, the request update/priority logic 204 determines whether the memory line is congested. In an embodiment, the request update/priority logic 204 makes this determination based on the line congested flag stored in the entry in the request residency buffer 208 for this memory line request. Upon determining that the memory line is congested, control continues at block 423, which is described in more detail below.

In block 420, upon determining that the memory line is not congested, a determination is made of whether the service node is congested. With reference to the embodiment of the processor interface 110/130 shown FIG. 2, the request update/priority logic 204 determines whether the service node 101 is congested. In an embodiment, the request update/priority logic 204 makes this determination based on the node congested flag stored in the entry in the request residency buffer 208 for this memory line request. Upon determining that the service node is congested, control continues at block 423, which is described in more detail below.

In block 422, upon determining that the service node is not congested, the priority of the request is updated. With reference to the embodiment of the processor interface 110/130 shown FIG. 2, the request update/priority logic 204 updates the priority of the memory line request. The request update/priority logic 204 updates the priority based on the amount of elapsed time since the associated entry for this memory line request has been stored in the request residency buffer 208. In an embodiment, the request update/priority logic 204 raises the priority for a memory line request the longer that the entry for such request has been stored in the request residency buffer 208. Accordingly, the priority is higher for a memory line request, the longer that such a request has not been serviced by the server node 101. Control continues at block 423.

In block 423, the memory line request is sent. With reference to the embodiment of the processor interface 110/130 shown FIG. 2, the FSCM requester logic 202 sends the memory line request. As described above, the memory line request sent has a number of flow control fields that includes the priority and the registration for this memory line request. Control continues at block 402, wherein another determination is made of whether there is a memory line request to send.

In block 424, upon determining that there is not a memory line request to send, a determination is made of whether a response is received to a memory line request. With reference to the embodiment of the processor interface 110/130 shown FIG. 2, the response processing logic 206 determines whether a response 214 is received based on a memory line request 310 that was previously transmitted. Upon determining that this is not a response to a memory line request, control continues at block 402, wherein another determination is made of whether there is a memory line request to send.

In block 426, upon determining that a response to a memory line request is received, a determination is made of whether the response received is a NACK. With reference to the embodiment of the processor interface 110/130 shown FIG. 2, the response processing logic 206 determines whether the response received is a NACK. As described above, the response from a service node 101 has a number of flow control fields including an indication of whether the response is a NACK or an ACK.

In block 428, upon determining that the response received is not a NACK, the request entry (for this request) in the request residency buffer 208 is deleted. With reference to the embodiment of the processor interface 110/130 shown FIG. 2, the response processing logic 206 deletes this request entry. As described above, if an ACK is received, the service node 101 is to service the memory line request. Therefore, the request entry (for this request) may be deleted because only requests that have not yet been serviced have entries in the request residency buffer 208. Control continues at block 402, wherein another determination is made of whether there is a memory line request to send.

In block 430, upon determining that the response received is a NACK, the flow control fields from the response are stored in the relevant entry in the request residency buffer. With reference to the embodiment of the processor interface 110/130 shown in FIG. 2, the response processing logic 206 stores the flow control fields from the response in the relevant entry in the request residency buffer 208. As described above, the flow control fields from the response include the NACK field, the line congested field, the node congested field and the registration flag. Control continues at block 402, wherein another determination is made of whether there is a memory line request to send.

As described, a priority for a request is frozen (not updated) if the access to the memory line is congested or if the service node that is to service the request is congested.

By freezing the updates to the priority after congested arises, the number of memory line requests having a highest priority are limited. This freeze of the updates effectively precludes lesser priority requests from acquiring the highest priority, thus letting the service node 101 to serve outstanding high priority requests in a finite amount of time. As further described below, notification of congestion is transmitted to each requester node 101 that requests memory lines from a service node 101. Therefore, repeating this freeze operation at the different requester nodes 101 allows for serviceability of the different requests of highest priority across the system 100 in a finite amount of time, thereby precluding starvation of requests across the system 100. Moreover, besides limiting the number of requests of highest priority, this freeze operation preserves fairness among outstanding memory line requests.

Figure 5A:
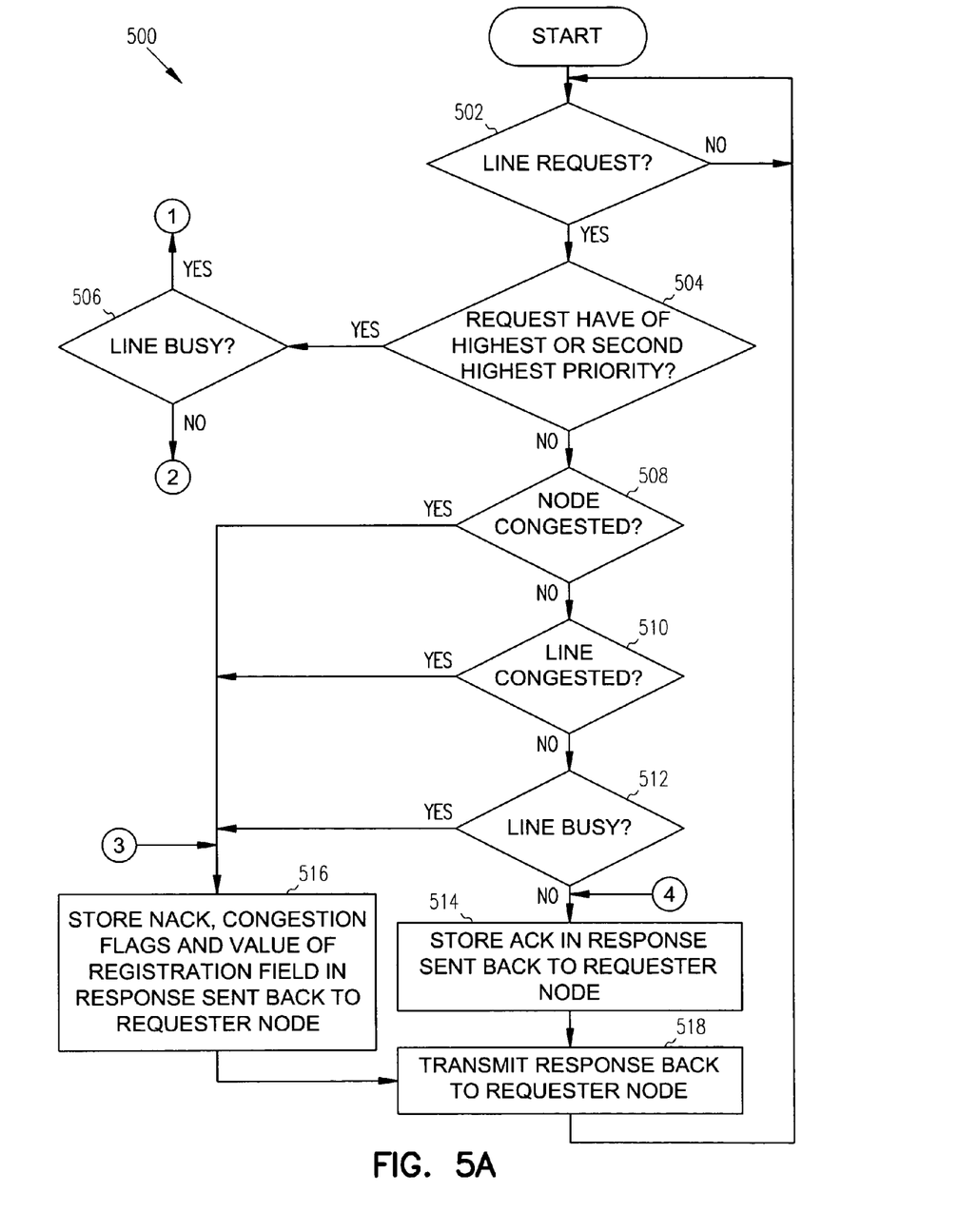
FIGS. 5A–5C illustrate flow diagrams for receiving and processing requests for a memory line in a memory in a multi-processor system, according to one embodiment of the invention.
Figure 5B:
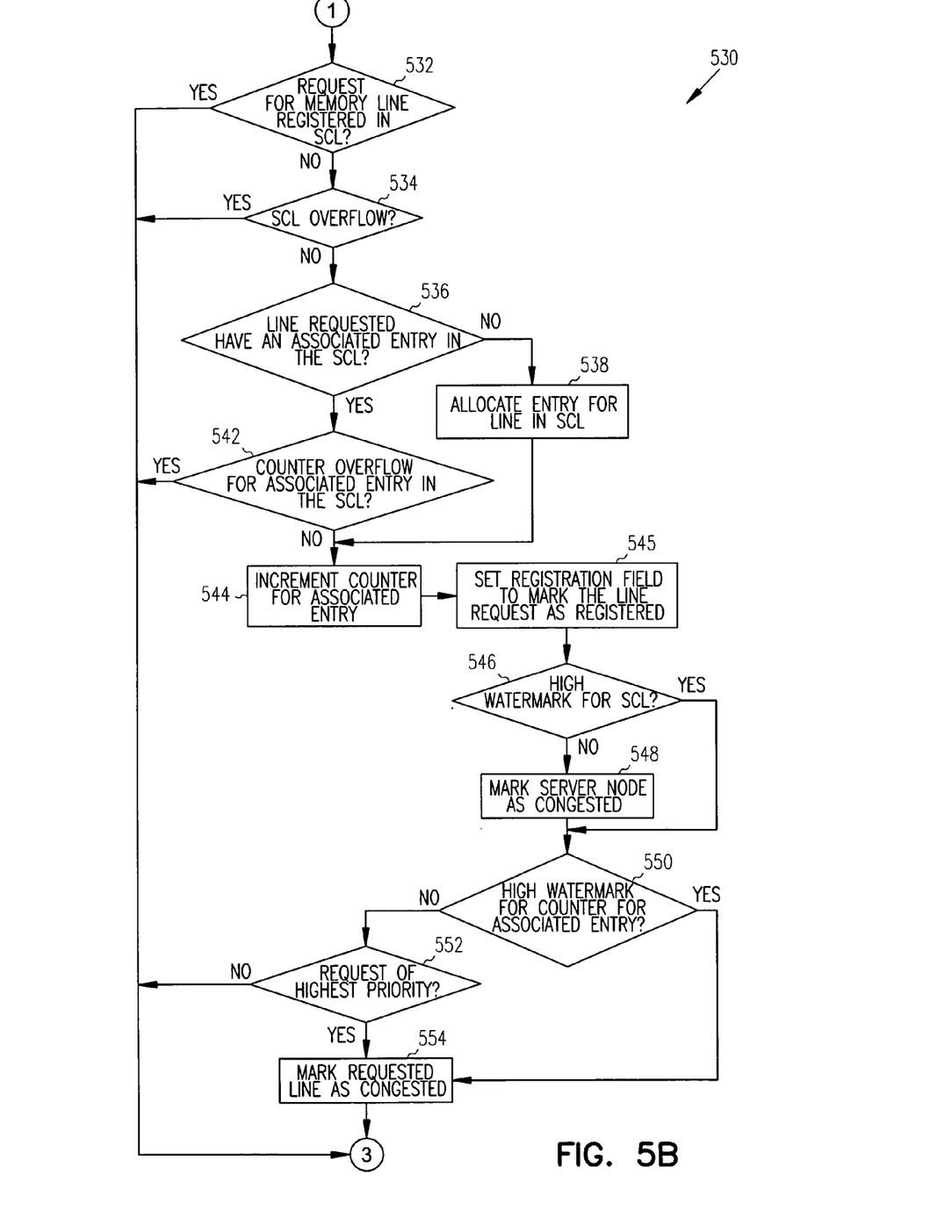
Figure 5C:
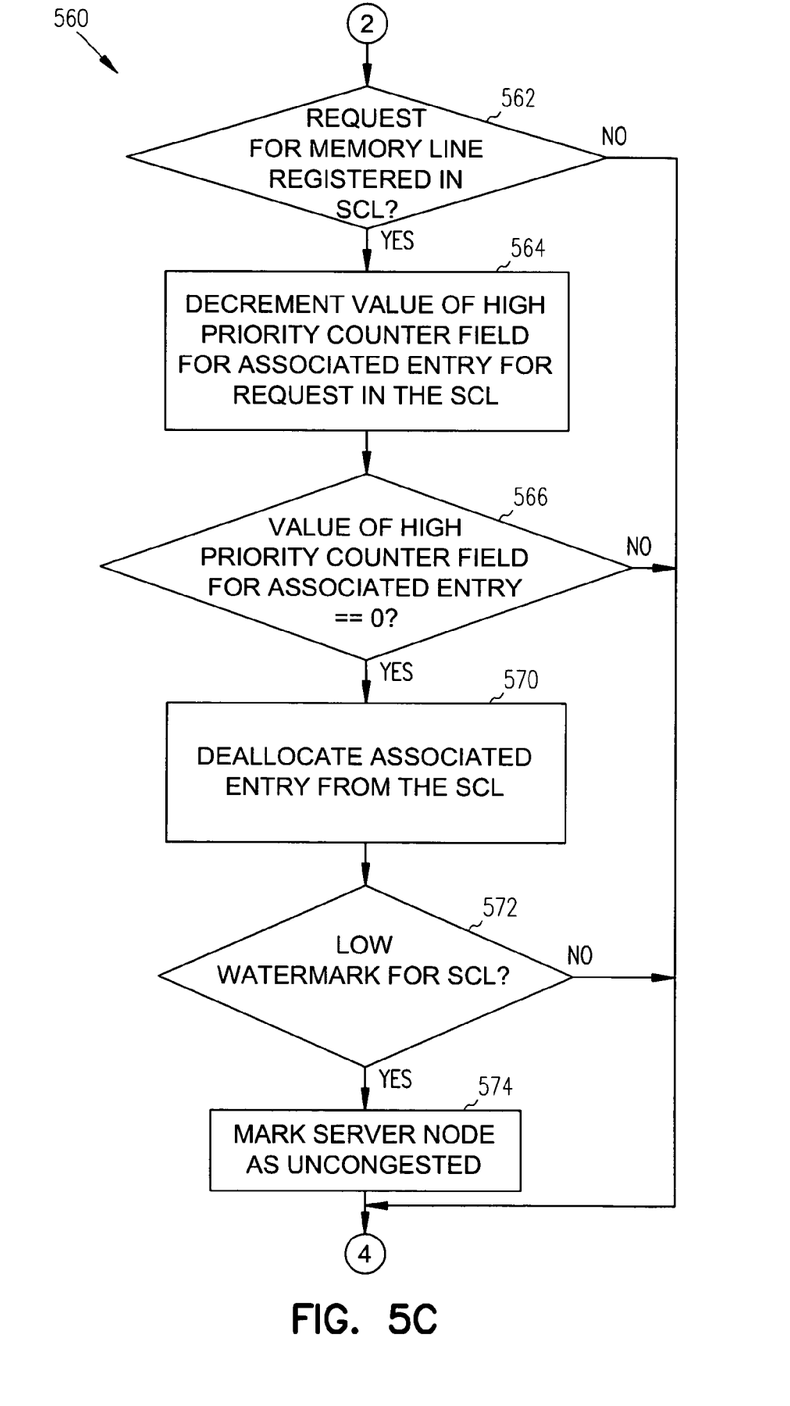

The operations for generating a response to the memory line request are now described. In particular, FIGS. 5A–5C illustrate flow diagrams for receiving and processing requests for a memory line in a memory in a multi-processor system, according to one embodiment of the invention. In particular, the flow diagram 500, 530 and 560 illustrate the operations of the memory/directory interface 116/136 in a node acting as a service node, according to one embodiment of the invention.

In block 502, a determination is made of whether a request for a memory line is received. With reference to the embodiment of the memory/directory interface 116/136 shown FIG. 3, the memory logic 312 determines whether the memory line request 314 is received from a request node 101. Upon determining that the memory line request 314 is not received, control continues at block 502 where the determination is again made regarding the receipt of the request for a memory line.

In block 504, upon determining that a memory line request is received, a determination is made of whether the memory line request received is of a highest priority or of a second highest priority. With reference to the embodiment of the memory/directory interface 116/136 shown FIG. 3, the memory logic 312 determines whether the memory line request 314 is of a highest priority or of a second highest priority. As described above, the logic in the requester node 101 assigns a priority value to the memory line request 314 based on the amount of elapsed time that the associated entry for this memory line request has been stored in the request residency buffer 208 in the requester node 101. For the system 100, the values of the priority of the memory line requests are in a range from lowest to highest. As described above, one of the flow control fields in the memory line request is the priority. Therefore, the memory logic 312 determines whether the priority stored in the memory line request 314 is a highest or second highest priority. Upon determining that the memory request 314 is not of a highest priority or a second highest priority, control continues at block 508, which is described in more detail below.

In block 506, upon determining that the memory request is of a highest priority or a second highest priority, a determination is made of whether the memory line is busy. With reference to the embodiment of the memory/directory interface 116/136 shown FIG. 3, the memory logic 312 determines whether the memory line being requested is busy. In other words, the memory logic 312 determines whether the memory line being requested is busy. For example, the memory line may be busy if the memory line is being updated based on a different memory line request from a processor in a different requester node 101. Upon determining that the memory line is busy, control continues at point one (which continues at the flow diagram 530 of FIG. 5B. Upon determining that the memory line is not busy, control continues at point two (which continues at the flow diagram 560 of FIG. 5C).

In block 508, upon determining that the memory request is not of a highest priority or a second highest priority, a determination is made of whether the service node is congested. With reference to the embodiment of the memory/directory interface 116/136 shown FIG. 3, the low priority logic 310 determines whether the service node 101 (that contains the low priority logic 310 and is servicing the memory line request 314) is congested. In an embodiment, the service node 101 is congested if the starvation control list 306 is in danger of being overrun (of overflow). As further described below, a high watermark value is associated with the starvation control list 306. Therefore, the service node is considered congested if the number of entries in the starvation control list 306 exceeds the high watermark. For example, if the maximum number of entries of the starvation control list 306 is 64, the high watermark may be set at 60. If the number of entries of the starvation control list 306 are equal to or greater than 60, the service node 101 is considered congested. Upon determining that the service node is congested, control continues at block 516, which is described in more detail below.

In block 510, upon determining that the service node is not congested, a determination is made of whether memory line is congested. With reference to the embodiment of the memory/directory interface 116/136 shown FIG. 3, the low priority logic 310 determines whether the memory line is congested. In an embodiment, a memory line is considered congested if the number of requests (for the memory line) of a highest priority or of a second highest priority exceeds a predefined threshold or if a memory line request does not get serviced in a predefined time. As further described in more detail below in the flow diagram 530 of FIG. 5B, the LBHP logic 308 may create an entry in the starvation control list 306 for a memory line if a request for such line is of a highest or second highest priority and is denied access to the memory line (the line is busy). Such an entry includes a line congested flag that indicates whether the given memory line is congested. Accordingly, the low priority logic 310 may make the determination of whether the memory line is congested based on the value of the line congested flag for the entry in the starvation control list 306 for this memory line. Upon determining that the memory line is congested, control continues at block 514, which is described in more detail below.

In block 512, upon determining that the memory line is not congested, a determination is made of whether the memory line is busy. With reference to the embodiment of the memory/directory interface 116/136 shown FIG. 3, the memory logic 312 determines whether the memory line being requested is busy. In other words, the memory logic 312 determines whether the memory line being requested is busy. Upon determining the memory line is busy, control continues at block 516, which is described in more detail below.

In block 514, upon determining that the memory line is not busy, an ACK is stored in the response that is to be sent back to the requester node. With reference to the embodiment of the memory/directory interface 116/136 shown FIG. 3, the low priority logic 310 sets the NACK field (one of the flow control fields) in the response to indicate that an ACK is being sent in response to the memory line request and the line of data will be sent by the memory interface logic 312 to the processor that requested the line. Such an ACK indicates the memory line is not busy, the memory line is not congested and the service node is not congested (i.e., the request was accepted). Control continues at block 518, which is described in more detail below.

In block 516, a NACK, congestion flags and the value of the registration field are stored in the response that is to be sent back to the requester node. With reference to the embodiment of the memory/directory interface 116/136 shown FIG. 3, the low priority logic 310 sets the NACK field in the response to indicated that a NACK is being sent in response to the memory line request. In other words, the requester node 101 is denied access to the memory line. Such a NACK indicates that (1) the memory line is busy, (2) the memory line is congested and/or (3) the service node is congested. Control continues at block 518.

In block 518, the response is transmitted back to the requester node. With reference to the embodiment of the memory/directory interface 116/136 shown FIG. 3, either the LNBHP logic 304, the LBHP logic 308 or the low priority logic 310 transmit the response back to the requester node 101. If the memory line request is not of a highest or second highest priority, the low priority logic 310 transmits the response back to the requester node 101. If the memory line request is of a highest or second highest priority and the memory line is not busy, the LNBHP logic 304 transmits the response back to the requester node 101. If the memory line request is of a highest or second highest priority and the memory line is busy, the LBHP logic 308 transmits the response back to the requester node 101. The LNBHP logic 304, the LBHP logic 308 or the low priority logic 310 assigns a value to the flow control fields that are included in the response. In addition to assigning a value to the NACK field, the LNBHP logic 304, the LBHP logic 308 or the low priority logic 310 assigns a value to the line congested field and the node congested field indicating whether the memory line and service node are congested, respectively. In an embodiment, if the incoming memory line request is NACKed, the LNBHP logic 304, the LBHP logic 308 or the low priority logic 310 overlays the priority field (that is in the memory line request) with the NACK field, the line congested field and the node congested field. The LNBHP logic 304, the LBHP logic 308 or the low priority logic 310 also writes a value into the registration field before sending the response back to the requester node 101.

The flow diagram 530 of FIG. 5B is now described. The operations of the flow diagram 530 commence at point one of the flow diagram 500 of FIG. 5A. In particular, the flow diagram 530 illustrates the operations in the memory/directory interface 116/136 after a memory line request (of highest or second highest priority) is received for a memory line that is busy.

In block 532, a determination is made of whether this particular request for the memory line is registered in the service node. With reference to the embodiment of the memory/directory interface 116/136 shown FIG. 3, the LBHP logic 308 determines whether this request for this memory line is registered in the service node 101. In particular, the LBHP logic 308 tracks those requests for memory lines that have a highest or second highest priority which are denied access because the memory line is busy. In an embodiment, such requests for a memory line are registered using the starvation control list 306. A given memory line request may be retried a number of times if the memory line is busy. However, a memory line request is registered only once and not each time that the request is retried. Upon determining that this request for the memory line is registered, control continues at point three, which continues at block 516 of FIG. 5A, wherein a NACK, congestion flags and the value of the registration field are stored in the response sent back to the requesting node 101.

In block 534, upon determining that this particular request for the memory line is not registered in the service node, a determination is made of whether the starvation control list 306 is in an overflow state. With reference to the embodiment of the memory/directory interface 116/136 shown FIG. 3, the LBHP logic 308 determines whether the starvation control list 306 is in an overflow state. The LBHP logic 306 may make this determination based on whether all of the entries have the valid bit asserted (i.e., there is no free entry left). Upon determining that the starvation control list 306 is in an overflow state, control continues at point three, which continues at block 516 of FIG. 5A, wherein a NACK, congestion flags and the value of the registration field are stored in the response sent back to the requesting node 101.

In block 536, upon determining that the starvation control list 306 is not in an overflow state, a determination is made of whether the memory line requested has an associated entry in the starvation control list 306. With reference to the embodiment of the memory/directory interface 116/136 shown FIG. 3, the LBHP logic 308 determines whether the memory line requested has an associated entry in the starvation control list 306 (based on the value of the memory address). Upon determining that the memory line requested has an associated entry in the starvation control list 306, control continues at block 542, which is described in more detail below.

In block 538, upon determining that the memory line requested does not have an associated entry in the starvation control list 306, an associated entry for the memory line is allocated in the starvation control list 306. With reference to the embodiment of the memory/directory interface 116/136 shown FIG. 3, the LBHP logic 308 allocates an entry in the starvation control list 306 for the memory line. As described above, in one embodiment, an entry in the starvation control list 306 includes a valid field, a memory line address field, a line congested field and a high priority counter field. Therefore, the LBHP logic 308 initializes these fields. The LBHP logic 308 sets the valid field to a value that indicates that the entry is valid. The LBHP logic 308 sets the value of the memory address field to the address of the memory line in the memory 106/126. The LBHP logic 308 initializes the value of the line congested field to indicate that the memory line is not congested. Additionally, the LBHP logic 308 initializes the value of the high priority counter field to zero. Control continues at block 544, which is described in more detail below.

In block 542, a determination is made of whether the high priority counter field for the associated entry in the starvation control list 306 is in an overflow state. With reference to the embodiment of the memory/directory interface 116/136 shown FIG. 3, the LBHP logic 308 determines whether the high priority counter field for the associated entry in the starvation control list 306 is in an overflow state. For example, if the number of bits that represent the high priority field is three, the maximum value of the high priority counter field is eight. Therefore, if the number of memory line requests from different processors in the system 100 are to exceed such value, the high priority counter field overflows. Upon determining that the high priority counter field is in an overflow state, control continues at point three, which continues at block 516 of FIG. 5A, wherein a NACK, congestion flags and the value of the registration field are stored in the response sent back to the requesting node 101. Upon determining that the high priority field is not in an overflow state, control continues at block 544, which is now described.

In block 544, the high priority counter field for the associated entry for the memory line request is incremented by one. With reference to the embodiment of the memory/directory interface 116/136 shown FIG. 3, the LBHP logic 308 increments this high priority counter field. Therefore, as described, an entry is allocated in the starvation control list 306 the first time a request (of a highest or second highest priority) is NACKed for a given memory line from any requester node 101 in the system 100 requests the given memory line in the server node 101, when there is not an associated entry allocated. Moreover, the high priority counter field in the entry is incremented each time that a highest priority or second highest priority request (for the given memory line) is NACKed for the first time (not including those requests that are retries because of a previous NACK). Control continues at block 545.

In block 545, the memory line request is marked as registered. With reference to the embodiment of the memory/directory interface 116/136 shown FIG. 3, the LBHP logic 308 marks the memory line request as registered. In an embodiment, the LBHP logic 308 marks the memory line request as registered by setting the registration field (a flow control field in the requests and responses) to indicate that the memory line request is registered. Control continues at block 546.

In block 546, a determination is made of whether the number of entries in the starvation control list 306 has exceeded a high watermark. With reference to the embodiment of the memory/directory interface 116/136 shown FIG. 3, the LBHP logic 308 makes this determination. The high watermark for the starvation control list 306 is a value of the number of entries that indicates that the starvation control list 306 is in danger of going into an overflow state. Upon determining that the number of entries in the starvation control list 306 does not exceed the high watermark, control continues at block 550, which is described in more detail below.

In block 548, upon determining that the number of entries in the starvation control list 306 does exceed the high watermark, the server node 101 is marked as congested. With reference to the embodiment of the memory/directory interface 116/136 shown FIG. 3, the LBHP logic 308 marks the server node 101 as congested. In an embodiment, the LBHP logic 308 marks the server node 101 as congested by setting a node congested flag that is stored (not shown) within the memory/directory interface 116/136. Control continues at block 550.

In block 550, a determination is made of whether the high priority counter field in the associated entry for this memory line request has exceeded a high watermark. With reference to the embodiment of the memory/directory interface 116/136 shown FIG. 3, the LBHP logic 308 makes this determination. The high watermark for a high priority counter field is a value that indicates that the count for this field is in danger of going into an overflow state. Upon determining that the high priority counter field has exceeded the high watermark, control continues at block 554, which is described in more detail below.

In block 552, upon determining that the high priority counter field has not exceeded the high watermark, a determination is made of whether the memory line request is of a highest priority. With reference to the embodiment of the memory/directory interface 116/136 shown in FIG. 3, the LBHP logic 308 makes this determination. As described above, the priorities of the memory line request have values that are from lowest to highest priority for the system 100. Therefore, the LBHP logic 308 determines whether the priority for this memory line request has a value that indicates that the priority is the highest. As described above, the operations of the flow diagram 530 of FIG. 5B are not executed unless the memory line request is of a highest or a second highest priority. Therefore, the LBHP logic 308 determines whether the memory line request is of a highest priority or a second highest priority. Upon determining that the memory line request is not of a highest priority, control continues at point three, which continues at block 516 of FIG. 5A, wherein a NACK, congestion flags and the value of the registration field are stored in the response sent back to the requesting node 101. Upon determining that the memory line request is of a highest priority, control continues at block 554, which is now described.

In block 554, the memory line that is requested is marked as congested. With reference to the embodiment of the memory/directory interface 116/136 shown FIG. 3, the LBHP logic 308 marks the memory line that is requested as congested. In particular, the LBHP logic 308 sets the line congested field in the entry (for this memory line) in the starvation control list 306 to indicate congestion. Therefore, a memory line is marked as congested if one of two conditions are present: (1) if the number of requests of highest or second highest priority that are NACKed exceed a given threshold (the high watermark) or (2) if the memory line request of highest priority is NACKed. Control continues at point three, which continues at block 516 of FIG. 5A, wherein a NACK, congestion flags and the value of the registration field are stored in the response sent back to the requesting node 101.

The flow diagram 560 of FIG. 5C is now described. The operations of the flow diagram 560 commence at point two of the flow diagram 500 of FIG. 5A. In particular, the flow diagram 560 illustrates the operations in the memory/directory interface 116/136 after a memory line request (of highest or second highest priority) is received for a memory line that is not busy.

In block 562, a determination is made of whether this particular request for the memory line is registered in the service node. With reference to the embodiment of the memory/directory interface 116/136 shown FIG. 3, the LNBHP logic 304 determines whether this request for this memory line is registered in the service node 101. As described above, those memory line requests that have a highest or second highest priority which are NACKed because the memory line is busy are tracked. In an embodiment, such requests are registered in the starvation control list 306. A given memory line request may be retried a number of times if the memory line is busy. However, a memory line request is registered once and not each time that the request is retried. Upon determining that this request for the memory line is not registered, control continues at point four, which continues at block 514 of FIG. 5A, wherein an ACK is stored in the response sent back to the requester node 101.

In block 564, upon determining that this request for the memory line is registered, the value in the high priority counter field in the associated entry for this request in the starvation control list 306 is decremented. With reference to the embodiment of the memory/directory interface 116/136 shown FIG. 3, the LNBHP logic 304 decrements this value. Because the memory line is not busy for this particular memory line request (that is of highest or second highest priority), the value in the high priority counter field may be decremented. Control continues at block 566.

In block 566, a determination is made of whether the value of the high priority counter field equals zero. With reference to the embodiment of the memory/directory interface 116/136 shown FIG. 3, the LNBHP logic 304 makes this determination. Upon determining that the value of the high priority counter field does not equal zero, control continues at point four, which continues at block 514 of FIG. 5A, wherein an ACK is stored in the response sent back to the requesting node 101.

In block 570, upon determining that the value of the high priority counter field does equal zero, the associated entry for this memory line is deallocated from the starvation control list 306. With reference to the embodiment of the memory/directory interface 116/136 shown FIG. 3, the LNBHP logic 304 deallocates this associated entry from the starvation control list 306. As described, once the responses (to memory line requests of a highest or second highest priority) that are ACKed equal the responses (to memory line requests of a highest or second highest priority) that are NACKed, the entry for the memory line may be removed by deasserting the valid bit from the entry in the starvation control list 306. Control continues at block 572.

In block 572, a determination is made of whether the number of entries in the starvation control list 306 equal a low watermark. With reference to the embodiment of the memory/directory interface 116/136 shown FIG. 3, the LNBHP logic 304 makes this determination. The low watermark for the starvation control list 306 provides an indication that the node is no longer congested (i.e., no longer in danger of going into an overflow state). For example, if the maximum number of entries in the starvation control list 306 equal 64, the low watermark may be 50. Upon determining that the number of entries in the starvation control list 306 does not equal the low watermark, control continues at point four, which continues at block 514 of FIG. 5A, wherein an ACK is stored in the response sent back to the requesting node 101.

In block 574, upon determining that the number of entries does equal the low watermark, the server node is marked as uncongested. With reference to the embodiment of the memory/directory interface 116/136 shown FIG. 3, the LNBHP logic 304 marks the server node 101 as uncongested by deasserting the node congested flag stored in the server node 101 to indicated that the node is uncongested. Control continues at point four, which continues at block 514 of FIG. 5A, wherein an ACK is stored in the response sent back to the requesting node 101.

Thus, methods, apparatuses and systems for memory access management in a shared memory multi-processor system have been described. Although the invention has been described with reference to specific exemplary embodiments, it will be evident that various modifications and changes may be made to these embodiments without departing from the broader spirit and scope of the invention. For example, while embodiments of the operations are described with the management of fairness, starvation and congestion with regard to access of data in memory in a multi-processor system, embodiments of the invention are no so limited. In particular, embodiments of the invention may be used in the management of fairness, starvation and congestion of other types of resources. Additionally, while embodiments of the invention have been described with reference to priorities for memory line requests being assigned based on request residency time in the request residency buffer, embodiments of the invention are not so limited. For example, in another embodiment, the priorities for memory line requests may based on NACK-based priority operations, wherein the priorities are based on the number of NACKs received for a given memory line request. Therefore, the specification and drawings are to be regarded in an illustrative rather than a restrictive sense.

What is claimed is:

1. An apparatus comprising:
a requester logic to transmit a request for a resource to a service node, the request having a priority, wherein the requester logic is to set the priority of the request, the service node to mark the resource as congested, if the priority of the request is of a highest priority and the request is denied access to the resource, wherein the requester logic is to receive a response to the request from the service node, the requester logic to cause a freeze to priority updates of other requests for the resource upon determining that access to the resource is congested.

2. The apparatus of claim 1, wherein the requester logic is to store the priority of the request and a time that the request has awaited service by the service node.

3. The apparatus of claim 1 further comprising a request buffer to store the request until the resource is accessed for the request.

4. The apparatus of claim 3, wherein the priority of the request is based on an elapsed time since the request is stored in the request buffer.

5. The apparatus of claim 1, wherein the requester logic is to freeze updates of priorities of requests for other resources in the service node if the service node is congested.

6. A service node comprising:
a memory to store a number of lines of data;
a starvation control list; and
a server logic to receive requests for a line of data of the number of lines of data, the server logic to determine if access to the line of data is congested, the server logic to store an entry associated with the line of data in the starvation control list if access to the line of data is congested.

7. The service node of claim 6, wherein the access to the line of data is congested if one of the requests having a highest priority is denied access to the line of data.

8. The service node of claim 6, wherein the server logic is to mark the service node as congested if a number of valid entries in the starvation control list exceeds a threshold.

9. The service node of claim 6, wherein the access to the line of data is congested if a number of requests of a highest priority and of a second highest priority, which are denied access to the line of data, exceed a threshold.

10. An apparatus comprising:
a requester node to transmit a request for data in a memory; and
a service node that includes the memory, the service node to receive the request for the data, wherein the service node is to set a congestion flag in response to the request sent back to the requester node upon determining that access to the data is congested, wherein the requester node is to freeze priority updates for the data upon receipt of the congestion flag.

11. The apparatus of claim 10, wherein the service node is to determine that access to the data is congested upon determining that the request is of a highest priority and the service node cannot access the data for the request from the requester node.

12. The apparatus of claim 10, wherein the service node is to determine that access to the data is congested upon determining that the service node cannot access the data for a number of requests of a highest priority and of a second highest priority that exceed a threshold.

13. The apparatus of claim 10, wherein the requester logic is to freeze updates of priorities of requests for other data in the memory if the service node is congested.

14. The apparatus of claim 10, wherein the requester node comprises a request buffer to store the request until the request is accepted, wherein a priority for the request is based on an elapsed time since the request is stored in the request buffer.

15. The apparatus of claim 10, wherein the service node includes a starvation control list, the service node to store an entry associated with the data in the starvation control list if the request for the data is of a highest priority and if access to the data is congested.

16. The apparatus of claim 15, wherein the service node is congested if a number of valid entries in the starvation control list exceeds a threshold.

17. A system comprising:
an interconnection network; and
a number of nodes coupled together through the interconnection network, wherein a first node of the number of nodes comprises:
a memory to store a number of lines of data; and
a hub that includes a server logic to receive, through the interconnection network, a request from a second node of the number of nodes for a line of data of the number of lines of data, wherein the server logic is to preclude other nodes of the number of nodes from increasing priority of requests to the line of data, if the request is of a highest priority and, if, in response to the request, the server logic is to transmit a negative acknowledgement response.

18. The system of claim 17, wherein the line of data is congested if the request is of the highest priority and the server logic is to transmit a negative acknowledgement response, in response to the request.

19. The system of claim 18, wherein the server logic is to store an entry associated with the line of data in a starvation control list upon determining that access to the line of data is congested if the request is of a highest priority or of a second highest priority.

20. The system of claim 17, wherein the server logic is to mark the first node as congested if a number of valid entries in the starvation control list exceeds a threshold.

21. The system of claim 17, wherein access to the line of data is congested if a number of outstanding requests of a highest priority and of a second highest priority, which are denied access to the line of data, exceed a threshold.

22. A system comprising:
an interconnection network; and
a number of nodes coupled together through the interconnection network, wherein a requester node of the number of nodes comprises:
a number of processors, wherein one of the number of processors is to generate a request for data in a memory; and
a processor interface, wherein the processor interface comprises:
a request buffer; and
a requester logic to transmit the request having a priority to a service node of the number of nodes, the service node to send a response to the requester node to cause the requester logic to freeze priorities of other requests for the data if access to the data is congested.

23. The system of claim 22, wherein access to the data is congested if the priority of the request is of a highest priority and, if, in response to the request, the service node denies access to the data.

24. The system of claim 22, wherein the requester logic is to store an entry for the request into the request buffer until the resource is accessed for the request.

25. The system of claim 22, wherein the requester logic is to store, in the request buffer, the priority of the request, an indication of how long the request has been awaiting service and an indication of whether the service node is congested into the entry.

26. The system of claim 22, wherein the requester logic is to freeze updates of priorities of requests for other data in the memory if the service node is congested.

27. The system of claim 22, wherein the priority of the request is based on an elapsed time since the request was accepted into the request buffer.

28. A method comprising:
receiving a request for data in a memory, the request having a priority;
transmitting the request to a service node that includes the memory; and
updating priorities of other requests for the data if the data is not congested, wherein updating priorities of other requests for the data if the data is not congested comprises freezing updates of priorities of other requests for the data upon determining that the priority of the request is of a highest priority and the request is denied.

29. The method of claim 28 further comprising updating priorities of requests for other data in the memory if the service node is not congested.

30. The method of claim 28, wherein the priority of the request is based on an elapsed time since the request was accepted for storage into a request buffer.

31. A method comprising:
receiving a number of requests for a line of data in a service node;
transmitting a positive acknowledgment to a request of the number of requests upon determining that the line of data is accessible;
transmitting a negative acknowledgement to a request of the number of requests upon determining that the line of data is not accessible;
freezing updates of priorities of the requests if one of the requests is of a highest priority and is denied access to the line of data; and
freezing updates of priorities of the requests if a number of the requests of the highest priority and of a second highest priority that are denied access to the line of data exceed a threshold.

32. The method of claim 31, further comprising freezing updates of priorities of the requests if the server node is congested.

33. The method of claim 31, further comprising storing an entry of a number of entries for the line of data into a starvation control list if a request of the number of requests is of a highest priority or of a second highest priority and is the line of data is not accessible.

34. The method of claim 33, further comprising marking the service node as congested upon determining that the number of valid entries in the starvation control list exceeds a threshold.

* * * * *